March 16, 1948.  B. HOLOHAN  2,437,957
LATHE CENTER
Filed June 23, 1944
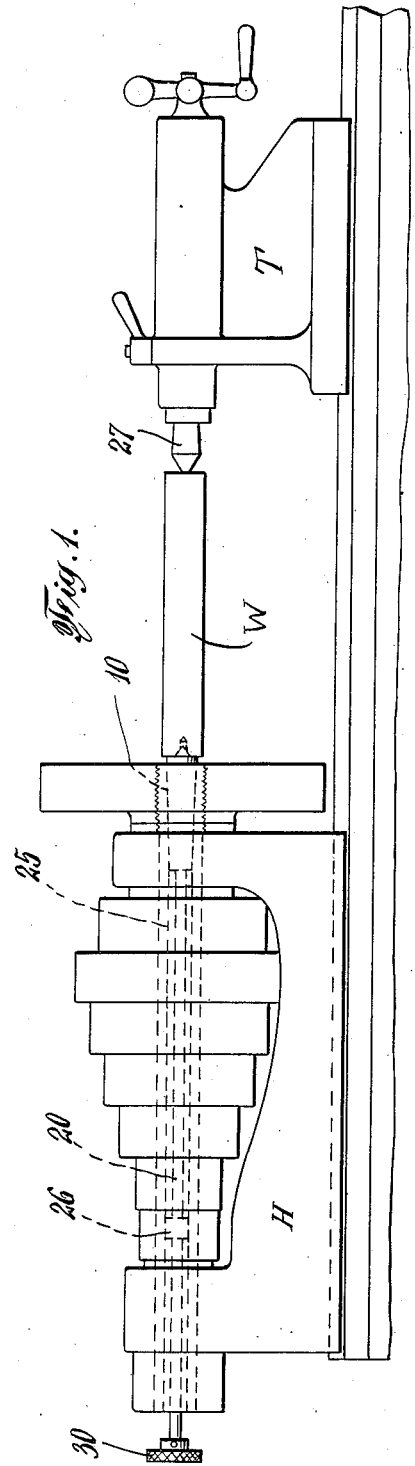
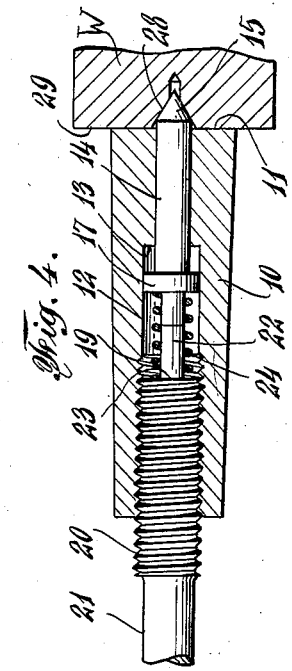
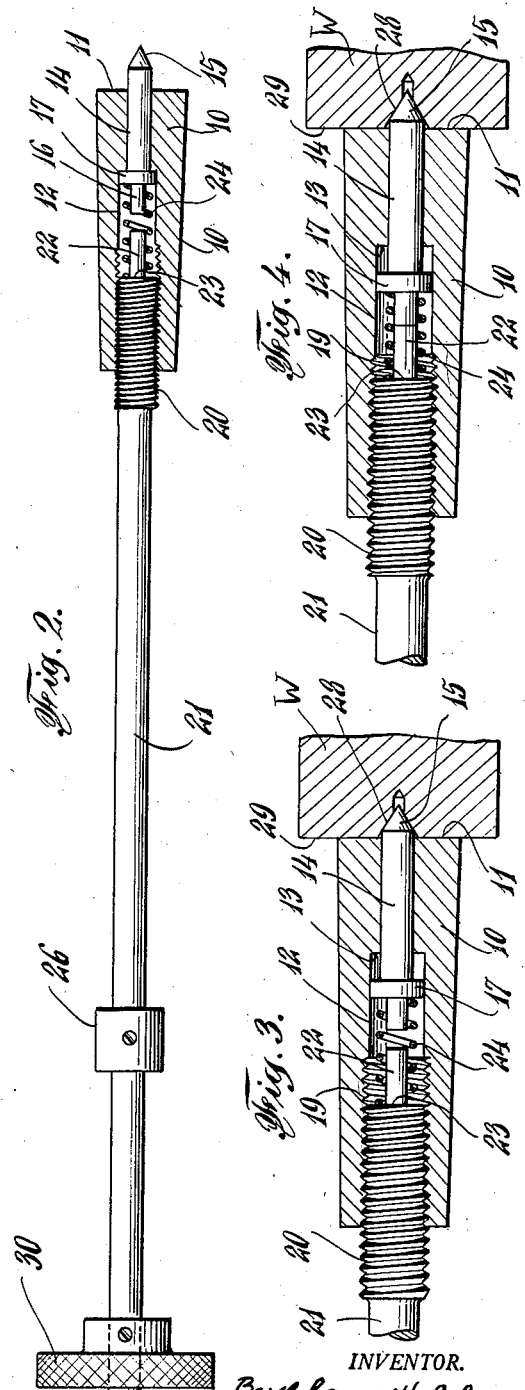
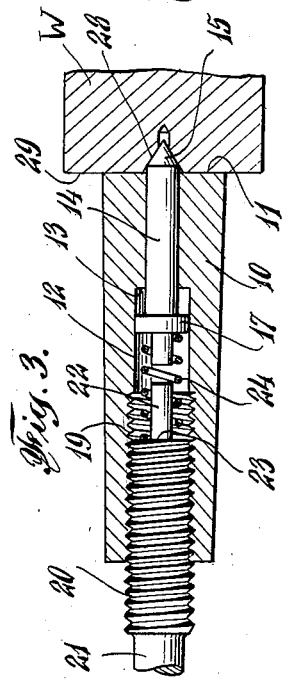
INVENTOR.
Bartholomew Holohan
BY
his ATTORNEY Patented Mar. 16, 1948

2,437,957

UNITED STATES PATENT OFFICE 2,437,957

LATHE CENTER

Bartholomew Holohan, New York, N. Y., assignor to Nelpin Manufacturing Company, Long Island City, N. Y., a firm Application June 23, 1944, Serial No. 541,678

1 Claim. (Cl. 82—33)

This invention relates to lathe centers and is specifically directed to the provision of an improved center of novel construction particularly adapted for use in the headstock of a lathe.

As is well known, when stock is mounted for machining between conventional headstock and tailstock lathe centers, its position longitudinally of the lathe is determined by the tapered forward end of the rigid headstock center, having the usual 60 degrees angle, with which the surface of the conical center hole of equal angle, drilled in the corresponding end of the work, is brought into contact. Since slight variations are inevitable in the depth of a series of center holes drilled in different workpieces, the longitudinal position of a number of workpieces successively mounted between the centers will not be identical relative to the lathe bed; therefore, if the work pieces have to be undercut at fixed distances from the ends thereof to provide shoulders or the like and accurate work is required, measurements must be taken and the cutting tool must be re-set several times for each piece to be machined. Obviously, this requires time consuming operations and the use of comparatively skilled labor with the resulting slow production and increase in the cost of manufacture.

It is therefore the general object of the invention to provide a center for the headstock of a lathe which, while comprising means for centering and supporting the work to be machined in cooperation with a conventional tailstock center, is so conformed as to insure that any number of workpieces successively mounted between the centers will be automatically located in identical position longitudinally of the lathe.

It is a further and more specific object of the invention to provide a lathe center of the aforementioned character having a body formed with a flat terminal face adapted to be engaged by a previously faced end of the work, to define the position of this latter longitudinally of the lathe, and an axial center pin projecting from the aforesaid flat face of the body for engaging the usual center hole in the end of the work to center and support this latter, the center pin being yieldably mounted in the body to permit contact of the faced end of the work with said flat face of the body irrespective of the depth of the center hole.

It is another and important object of the invention to provide means for locking the yieldably mounted center pin in any desired longitudinal position so as to positively maintain the same in engagement with the associated center hole against any thrusts tending to axially displace the center pin during machining of the work.

The invention has also for its object to provide a lathe center of the character described which is of simple construction and inexpensive to manufacture, and which may be readily assembled and mounted in the lathe spindle and removed therefrom.

These and other objects will become apparent in the following description of the invention illustrated in the drawings wherein:

Fig. 1 is a side elevational view of a lathe showing a center according to the invention mounted in the lathe headstock and in operation.

Fig. 2 is an longitudinal view, partly in section, of the lathe center, illustrating the various elements thereof.

Fig. 3 is a longitudinal vertical sectional view of the lathe center, and portion of the associated work, showing the position of the center pin relative to the center body when the center is in operation.

Fig. 4 is a similar longitudinal sectional view showing the center pin locked in engagement with its associated center hole.

Referring now in detail to the drawings, and particularly to Figs. 2 to 4, numeral 10 indicates the body of the center which is tapered so as to fit in the conventional lathe spindle and is formed, at the forward end thereof, with a flat face 11 lying in a plane perpendicular to the axis of the center.

The body 10 is provided with an axial bore 12, which extends from the rear end of the body for approximately two thirds of the length of this latter and defines a shoulder 13 internally of the body, as best shown in Figs. 3 and 4. A center pin 14 is slidably mounted in an extension of reduced diameter of the bore 12, for longitudinal movement within the body in opposite directions, and is provided at its forward end with a conical portion 15 projecting from the aforementioned flat face 11 of the body and adapted to be received in conventional center holes drilled in the work. The rear end portion 16 of the center pin, which extends into the bore 12, is formed with an enlarged portion or collar 17 slidable in the bore and adapted to abut against the shoulder 13, thereby to limit the extent of outward movement of the center pin.

The bore 12 is threaded along part of its length, as shown at 19, to receive the threaded portion 20 of a rod 21, the portion 20 being provided with an axial extension 22 of reduced diameter defining a shoulder 23 on the rod and forming an abutment adapted to engage the end portion 16 of the center pin 14 to limit the amount of displacement of this latter inwardly of the body 10. A coil spring 24, mounted on the extension 22 and the end portion 16 of the center pin, bears against the shoulder 23 and the collar 17, and normally urges the center pin to an outwardmost position as shown in Fig. 2, in which the collar 17 abuts against the shoulder 13.

Since the portion 20 of the rod 21 is threadedly mounted in the bore 12 of the center body, it will be apparent that the extension 22 can be longitudinally adjusted within the bore to different positions, to variably limit the extent of displacement of the center pin inwardly of the body in opposition to the spring 24, for the purpose that will become hereafter apparent.

Referring now to Fig. 1, it will be observed that, in use, the center body 10 is mounted in the tapered end of the conventional spindle 25 of the lathe headstock H, and the rod 20 is passed through the spindle from the opposite end of this latter, to assemble the various elements of the device in the manner illustrated in the showing of Fig. 2, the rod being centered in the spindle by means of a spacer 26 suitably fastened thereto.

The work W, which is mounted at one end thereof on the center 27 of the lathe tailstock T, is moved toward the center body 10 to bring the opposite end 29 thereof into surface engagement with the flat face 11 of the center body, said end 29 of the work having been previously faced to insure proper contact of the opposed surfaces throughout their area, as illustrated in Figs. 3 and 4. In the movement of the work toward the center face 11, the conical portion 15 of the center pin 14 engages the usual center hole 28 provided in the end 29 of the work so that this latter is suitably centered and supported, the center pin being longitudinally displaced in opposition to the spring 24 by the amount required for effecting the contact of the opposed surfaces of the work and center body, as aforesaid. As will be apparent, any difference in the depth of the center holes provided in a number of workpieces successively mounted between the centers, will merely result in different amounts of longitudinal displacement of the slidable center pin, and an identical position of all workpieces longitudinally of the lathe will be insured by the contact of the true end face of each workpiece with the flat face of the center body fixed in the lathe spindle.

The center pin 14 is locked in its final position in centering and supporting engagement with the end of the work by turning the rod 21, which is provided with a knurled knob 30 at the free end thereof, to adjust the threaded portion 20 within the bore 12 so as to bring the extension 22 into abutting engagement with the rear end 16 of the center pin, as illustrated in Fig. 4.

It should be noted that the provision of a locking device is essential for the efficient operation of the lathe center, as during the cutting operation the center pin is subjected to axial thrusts that, in the absence of a locking device, may cause the slidable center pin to become disengaged from its associated center hole, or at least to be partially withdrawn therefrom, so that the workpiece would be improperly centered.

While I have described and illustrated a preferred embodiment of the invention, it will be understood that changes and modifications may be made therein without departing from the spirit of the invention or exceeding the scope of the claim.

I claim:

A center for the headstock of a lathe comprising a tapered body provided with a flat face at one end thereof, an axial bore extending into said body from the opposite end of this latter and defining a shoulder in the body, an axial center pin slidably mounted in the body with its end portions projecting respectively outwardly of said flat face of the body and into said bore, a collar on the end portion of said center pin which projects into the bore adapted to engage said shoulder to limit the outward movement of the center pin, a rod extending through the spindle of the lathe headstock having one end portion projecting into said bore and provided with a shoulder, a spring bearing against said shoulder of the end portion of the rod and said collar of the center pin to normally urge this latter to abut against the shoulder of the body, said end portion of the rod being threadedly mounted in the bore for adjustment longitudinally thereof into abutting engagement with the center pin to variably limit the amount of inward movement of the center pin in opposition to the spring.

BARTHOLOMEW HOLOHAN.

REFERENCES CITED

The following references are of record in the file of this patent:

UNITED STATES PATENTS

| Number | Name | Date |
|---|---|---|
| 979,034 | Rowe et al. | Dec. 20, 1910 |
| 1,317,894 | Robinson | Oct. 7, 1919 |
| 1,912,987 | Lovely | June 6, 1933 |
| 2,247,721 | Wright | July 1, 1941 |

FOREIGN PATENTS

| Number | Country | Date |
|---|---|---|
| 558,312 | France | Aug. 25, 1923 |